United States Patent
Wang et al.

(10) Patent No.: US 9,939,793 B2
(45) Date of Patent: Apr. 10, 2018

(54) PLANT CONTROL MONITORING SYSTEM

(75) Inventors: Yun Wang, Tokyo (JP); Akira Nojima, Tokyo (JP); Hiroyuki Fujieda, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 570 days.

(21) Appl. No.: 14/414,539

(22) PCT Filed: Aug. 3, 2012

(86) PCT No.: PCT/JP2012/069825
§ 371 (c)(1),
(2), (4) Date: Jan. 13, 2015

(87) PCT Pub. No.: WO2014/020754
PCT Pub. Date: Feb. 6, 2014

(65) Prior Publication Data
US 2015/0177719 A1    Jun. 25, 2015

(51) Int. Cl.
*G06F 15/173* (2006.01)
*G05B 15/02* (2006.01)
(Continued)

(52) U.S. Cl.
CPC ......... *G05B 15/02* (2013.01); *G05B 23/0208* (2013.01); *G06F 21/604* (2013.01);
(Continued)

(58) Field of Classification Search
CPC ... G05B 23/0208; G05B 15/02; G06F 21/604; G06F 21/629; H04L 67/42; H04L 29/06; H04L 29/08; H04L 67/10
See application file for complete search history.

(56) References Cited

U.S. PATENT DOCUMENTS

2003/0155415 A1* 8/2003 Markham ............... G06Q 50/00
 235/376
2007/0299907 A1* 12/2007 Deininger .......... G05B 19/4185
 709/203
(Continued)

FOREIGN PATENT DOCUMENTS

JP    2001-084026 A    3/2001
JP    2002-073166 A    3/2002
(Continued)

OTHER PUBLICATIONS

Combined Chinese Office Action and Search Report dated May 3, 2016 in Patent Application No. 201280075089.7 (with partial English language translation and English translation of categories of cited documents).

(Continued)

*Primary Examiner* — Cheikh Ndiaye
(74) *Attorney, Agent, or Firm* — Oblon, McClelland, Maier & Neustadt, L.L.P.

(57) ABSTRACT

A plant control monitoring system that can reduce communication traffic between a client and server to improve processing speed, and that includes: a server-side storage section provided in a server to store operation right processing information for a machine group on a client operation monitoring screen; client-side storage sections provided in clients to store duplicates of the operation right processing information of the server-side storage section; and operation right processing sections provided in the clients to correspond to each of the operation monitoring screens and that perform operation right processing based on the operation right processing information of the client-side storage sections. Operation right processing information for each client is stored in a global variable storage section of the client-side storage section, and operation right processing information (Continued)

for each operation screen is stored in a local variable storage section of the client-side storage section.

8 Claims, 5 Drawing Sheets

(51) Int. Cl.
  *G05B 23/02*  (2006.01)
  *H04L 29/08*  (2006.01)
  *H04L 29/06*  (2006.01)
  *G06F 21/60*  (2013.01)
  *G06F 21/62*  (2013.01)
(52) U.S. Cl.
  CPC ............ *G06F 21/629* (2013.01); *H04L 67/10* (2013.01); *H04L 67/42* (2013.01)

(56) References Cited

U.S. PATENT DOCUMENTS

| | | | |
|---|---|---|---|
| 2008/0126352 A1* | 5/2008 | Case | G06F 17/30902 |
| 2008/0155045 A1 | 6/2008 | Koyama | |
| 2008/0189637 A1* | 8/2008 | Krajewski | G06F 9/4443 |
| | | | 715/771 |
| 2010/0082131 A1* | 4/2010 | Baier | G06F 17/30017 |
| | | | 700/83 |
| 2010/0153771 A1* | 6/2010 | Gordon | G05B 19/4185 |
| | | | 714/4.1 |
| 2011/0181608 A1* | 7/2011 | Sunkara | G06F 3/1438 |
| | | | 345/522 |
| 2012/0290107 A1* | 11/2012 | Carlson | G05B 19/058 |
| | | | 700/83 |
| 2013/0211559 A1* | 8/2013 | Lawson | G06Q 10/06315 |
| | | | 700/83 |

FOREIGN PATENT DOCUMENTS

| | | |
|---|---|---|
| JP | 2003-295920 A | 10/2003 |
| JP | 2004-164258 A | 6/2004 |
| JP | 2006-268125 A | 10/2006 |
| JP | 2006-323475 A | 11/2006 |
| JP | 2008-147489 A | 6/2008 |
| JP | 2010-211670 A | 9/2010 |
| JP | 2011-198312 A | 10/2011 |

OTHER PUBLICATIONS

Office Action dated Dec. 22, 2015 in Japanese Patent Application No. 2014-527921 (with Partial English language translation).
International Search Report dated Aug. 28, 2012 in PCT/JP2012/069825 filed Aug. 3, 2012.

* cited by examiner

1: FIELD MACHINERY
2a: N01 HMI CLIENT
2b: N02 HMI CLIENT
6: CONTROLLER
8: HMI SERVER
8a: DATABASE
9c: N03 OPERATION MONITORING SCREEN
1a: ROUGHING MILL
1b: FINISHING MILL
1c: DOWN COILER
17: TAG RELATING TO ALARM PROCESSING INFORMATION
18: ALARM DETECTION PROCESSING MEANS
21: TAG RELATING TO ALARM RESULT INFORMATION
22: LAMP

PLANT CONTROL MONITORING SYSTEM

TECHNICAL FIELD

The present invention relates to a plant control monitoring system.

BACKGROUND ART

In conventional plant control monitoring systems, there are known those which are provided with a client-server type operator station (OPS), which consists of a client and a server, and a controller which controls a plant, in which an OPS server collects and stores controller data and an OPS client provides a man-machine interface to an operator while communicating necessary data with the OPS server (refer to Patent Literature 1, for example).

CITATION LIST

Patent Literature

Patent Literature: Japanese Patent Laid-Open No. 2002-073166

SUMMARY OF INVENTION

Technical Problem

In a plant control monitoring system in which a client-server type configuration is adopted like this, operation right processing and conditional-control operation part detection processing are performed each time an operation and the like are performed in a client. Operation right processing is processing for determining whether or not the operation in question and the like have a right to be authorized. Conditional-control operation part detection processing is processing for detecting that a conditional-control operation part (a part for which processing to be performed when the operation part in question is operated differs from one condition to another; for example, a toggle button) has been operated and for performing a condition determination concerning the processing to be executed by the operation in question.

And in such operation right processing and conditional-control operation part detection processing, it is necessary to refer to data retained on the server side. For this reason, each time operation right processing and conditional-control operation part detection processing are performed, communication is performed between a client and a server, posing the problem that operation right processing and conditional-control operation part detection processing take time.

There are two kinds of operation rights: an operation right set for each client terminal and an operation right set for each operation monitoring screen in a client. However, in a conventional plant control monitoring system as shown in Patent Literature 1, information necessary for the processing of an operation right set for each client and information necessary for processing an operation right set for each operation monitoring screen are stored in a database on the server without being discriminated and, therefore, there occurs the problem that it is impossible to sufficiently achieve optimization in which a difference in the properties of the two kinds of information and the like are considered.

Furthermore, in a conventional plant control monitoring system in which a client-server type configuration is adopted, processing for detecting troubles and the like in machine groups constituting plant equipment and for issuing an alarm is individually performed in each HMI client. For this reason, each time alarm detection processing is performed, a plurality of HMI clients make access to a tag relating to alarm processing information of an HMI server via a network. Therefore, communication processing traffic of alarm processing information between the HMI clients and the HMI server increases, resulting in a decrease in overall processing speed due to a bottleneck caused by this communication processing.

The present invention was made in order to solve these problems and the object thereof is to provide a client-server type plant control monitoring system capable of reducing communication traffic between a client and a server and of achieving an improvement in processing speed.

Means for Solving the Problems

A plant control monitoring system according to the present invention, includes: a controller which controls a plurality of machine groups constituting a plant; a plurality of HMI clients which are provided in such a manner as to correspond to each of the plurality of machine groups and in which one or more operation monitoring screens are displayed; an HMI server which is provided in such a manner as to be communicable with the HMI clients and collects data from the controller; a server-side storage section which is provided in the HMI server and stores operation right processing information on an operation right for the machine groups on the operation monitoring screens displayed in the HMI clients; client-side storage sections which are provided in the HMI clients and store operation right processing information duplicated from operation right processing information stored in the server-side storage section; and operation right processing sections which are provided in the HMI clients in such a manner as to correspond to each of the operation monitoring screens and perform operation right processing on the operation monitoring screens on the basis of operation right information stored in the client-side storage sections, wherein the client-side storage sections include: a global variable storage section which is provided for each of the HMI clients and is accessible from the operation right processing section belonging to the same HMI client; and a local variable storage section which is provided for each of the operation monitoring screens and is accessible from the operation right processing section belonging to the same operation monitoring screen, wherein the global variable storage section stores operation right processing information for each client on an operation right set for each of the HMI clients among operation right information, and wherein the local variable storage section stores operation right processing information for each screen on an operation right set for each of the operation monitoring screens among operation right information.

Or a plant control monitoring system according to the present invention, includes: a controller which controls a plurality of machine groups constituting a plant; a plurality of HMI clients which are provided in such a manner as to correspond to each of the plurality of machine groups and in which one or more operation monitoring screens are displayed; an HMI server which is provided in such a manner as to be communicable with the HMI clients and has a server-side storage section which stores data collected from the controller as alarm processing information; and an alarm detection processing section which is provided in the HMI server and performs, on the basis of alarm processing information stored in the server-side storage section, alarm detection processing, the alarm detection processing involving detecting a condition for which an alarm is to be issued for the machine groups corresponding to each of the plurality of HMI clients, wherein the server-side storage section stores alarm result information on results of alarm detection processing by the alarm detection processing section, and wherein the HMI clients include a notification section which performs notification of alarms on the basis of the alarm result information stored in the server-side storage section.

Advantageous Effects of Invention

A plant control monitoring system of the present invention produces the effects that communication traffic between a client and a server can be reduced and that an improvement in processing speed can be achieved.

DESCRIPTION OF EMBODIMENTS

The present invention will be described with reference to the accompanying drawings. In each of the drawings, identical reference numerals refer to identical or corresponding parts and overlaps of description of these parts are appropriately simplified or omitted.

Embodiment 1

Figure 1:
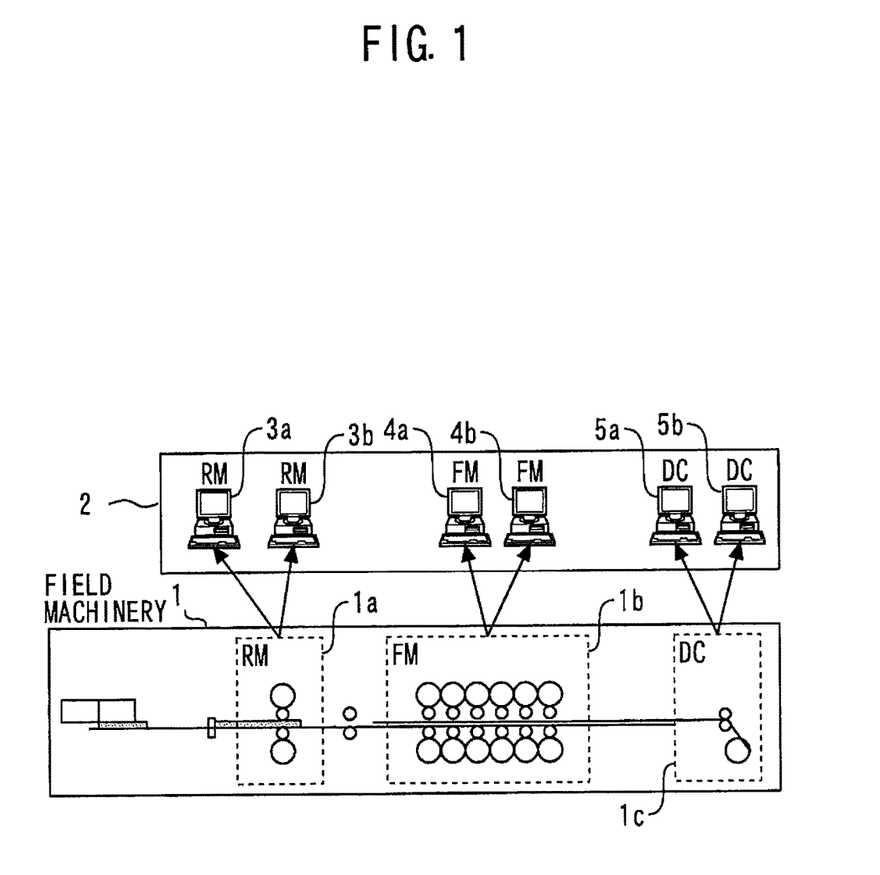
FIG. 1 is a diagram showing field machinery of plant equipment and HMI clients to which the plant control monitoring system related to Embodiment 1 of the present invention is applied.
Figure 2:
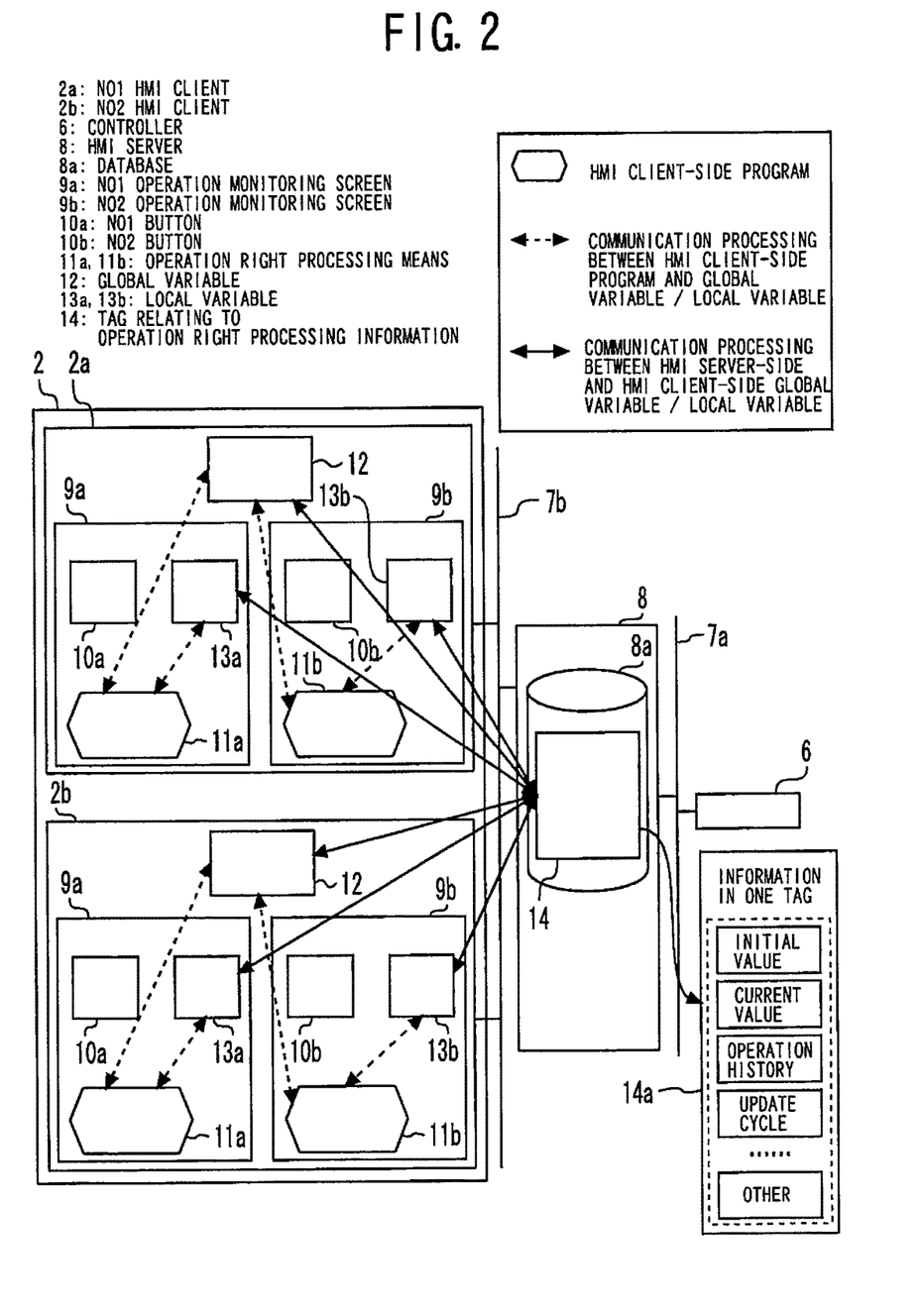
FIG. 2 is a diagram to explain the configuration of the plant control monitoring system related to Embodiment 1 of the present invention.

FIGS. 1 and 2 relate to Embodiment 1 of the present invention. FIG. 1 is a diagram showing field machinery of plant equipment and HMI clients to which the plant control monitoring system is applied, and FIG. 2 is a diagram to explain the configuration of the plant control monitoring system.

In FIG. 1, reference numeral 1 denotes field machinery provided in the plant equipment. Here, a rolling plant is described by giving a specific example of the plant equipment. The field machinery 1 is composed of a plurality of machine groups. The machine groups are obtained by classifying machines constituting the field machinery 1 on the basis of the commonality of functions which each machine has and the like.

Main machine groups provided in the field machinery 1 of a rolling plant include a roughing mill (RM) 1a, a finishing mill (FM) 1b, and a down coiler (DC) 1c. A material to be rolled is first rolled on the roughing mill 1a. After that, the rolled material is further rolled to a product plate thickness on the finishing mill 1b arranged on the delivery side of the roughing mill 1a. And the rolled material is wound in coil form on the down coiler 4 arranged on the delivery side of the finishing mill 1b.

In order to monitor the condition of each piece of the field machinery 1 (the roughing mill 1a, the finishing mill 1b, and the down coiler 1c) and to perform the operation thereof, one or more HMI clients 2 are provided in such a manner as to correspond to each of the machine groups constituting the field machinery 1. HMI is an abbreviation for human-machine interface.

Specifically, two HMI clients: a first roughing mill client 3a and a second roughing mill client 3b are provided in such a manner as to correspond to the roughing mill 1a. Two HMI clients: a first finishing mill client 4a and a second finishing mill client 4b are provided in such a manner as to correspond to the finishing mill 1b. Two HMI clients: a first down coiler client 5a and a second down coiler client 5b are provided in such a manner as to correspond to the down coiler 1c.

A manager (a supervisor, an operator; hereinafter referred to as "a manager and others") of the field machinery 1 performs the monitoring of the field machinery 1 and the operation thereof through the use of the HMI clients 2. Specifically, the manager and others perform the monitoring of the roughing mill 1a and the operation thereof using either the first roughing mill client 3a or the second roughing mill client 3b. The manager and others perform the monitoring of the finishing mill 1b and the operation thereof using either the first finishing mill client 4a or the second finishing mill client 4b. And the manager and others perform the monitoring of the down coiler 1c and the operation thereof using either the first down coiler client 5a or the second down coiler client 5b.

Each of the HMI clients 2 is communicably connected to an HMI server. And it is ensured that from each of the HMI clients 2, the monitoring of the condition of the field machinery 1 and the operation thereof are performed via the HMI server. FIG. 2 shows the configuration of the plant control monitoring system having this client-server type configuration.

A controller 6 is provided for each piece of the field machinery 1. This controller 6 performs the acquisition of condition data of the field machinery 1 and the control of the field machinery 1. The controller 6 is connected to a first communication network 7a. And an HMI server 8 is connected to the first communication network 7a. In this manner, the controller 6 and the HMI server 8 are connected to be mutually communicable via the first communication network 7a.

The HMI server 8 is connected not only to the first communication network 7a, but also to a second communication network 7b. And each of the HMI clients 2 is connected to this second communication network 7b. In this manner, the HMI server 8 and each of the HMI clients 2 are connected to be mutually communicable via the second communication network 7b.

As described above, one or more HMI clients 2 are provided for one machine group among the field machinery 1. Here, on the assumption that for example, these two HMI clients are provided for one machine group, it is assumed that these two HMI clients 2 are a first HMI client 2a and a second HMI client 2b.

In terms of the relation to the example of FIG. 1, the first roughing mill client 3a, the first finishing mill client 4a, and the first down coiler client 5a correspond to the first HMI client 2a, and the second roughing mill client 3b, the second finishing mill client 4b, and the second down coiler client 5b correspond to the second HMI client 2b.

The first HMI client 2a and the second HMI client 2b are each provided with a display device consisting of a display and the like, such as buttons, for displaying a UI (a user interface) which is required by the manager and others in operating these clients.

One or more operation monitoring screens are displayed in the display device provided in each of the HMI clients 2. Here, it is assumed that for example, two operation monitoring screens are displayed in each of the HMI clients 2. That is, the first operation monitoring screen 9a and the second operation monitoring screen 9b are displayed in the first HMI client 2a. And the first operation monitoring screen 9a and the second operation monitoring screen 9b are displayed also in the second HMI client 2b.

For example, a first operation button 10a is displayed on the first operation monitoring screen 9a displayed in each of the HMI clients 2. And for example, a second operation button 10b is displayed on the second operation monitoring screen 9b displayed in each of the HMI clients 2.

When the manager and others operate the operation button and the like displayed on the operation monitoring screen of the HMI client 2, an operation signal is sent to the HMI server 8 via the second communication network 7b. The contents of this operation signal are written in a pertinent tag variable of a database 8a provided in the HMI server 8 and the contents thereof are transmitted to the controller 6 via the first communication network 7a.

And conversely, data on the condition of the field machinery 1 acquired by the HMI server 8 from the controller 6 via the first communication network 7a is written in a pertinent tag variable of the database 8a provided in the HMI server 8 and is further displayed on the operation monitoring screen of the HMI client 2 via the second communication network 7b.

Each of the HMI clients 2 is provided with operation right processing means which performs operation right processing in each of the first operation monitoring screen 9a and the second operation monitoring screen 9b. This operation right processing means is provided in such a manner as to correspond to each of the first operation monitoring screen 9a and the second operation monitoring screen 9b; the operation right processing means corresponding to the first operation monitoring screen 9a is first operation right processing means 11a and the operation right processing means corresponding to the second operation monitoring screen 9b is second operation right processing means 11b.

Each of the HMI clients 2 is provided with a client-side operation right processing information storage section which stores operation right processing information. Operation right processing information is information on an operation right for machine groups on each of the operation monitoring screens (the first operation monitoring screen 9a and the second first operation monitoring screen 9b) displayed in each of the HMI clients 2.

The client-side operation right processing information storage section consists of a global variable storage section 12 and a local variable storage section. The global variable storage section 12 is a storage section which is accessible from the operation right processing means belonging to the same HMI client 2. The global variable storage section 12 is present in quantities of one in each of the HMI clients 2.

And the global variable storage section 12 of the first HMI client 2a is accessible from the first operation right processing means 11a and second operation right processing means 11b of the first HMI client 2a. Furthermore, the global variable storage section 12 of the second HMI client 2b is accessible from the first operation right processing means 11a and second operation right processing means 11b of the second HMI client 2b.

The local variable storage section is a storage section accessible from the operation right processing means belonging to the same operation monitoring screen. The local variable storage section is present in quantities of one in the operation monitoring screen of each of the HMI clients 2. That is, in each of the HMI clients 2, a first local variable storage section 13a corresponding to the first operation monitoring screen 9a and a second local variable storage section 13b corresponding to the second operation monitoring screen 9b are present.

And the first local variable storage section 13a of the first HMI client 2a is accessible only from the first operation right processing means 11a of the first HMI client 2a. Furthermore, the second local variable storage section 13b of the first HMI client 2a is accessible only from the second operation right processing means 11b of the first HMI client 2a.

Similarly, the first local variable storage section 13a of the second HMI client 2b is accessible only from the first operation right processing means 11a of the second HMI client 2b. Furthermore, the second local variable storage section 13b of the second HMI client 2b is accessible only from the second operation right processing means 11b of the second HMI client 2b.

Operation right processing information for each client on an operation right, which is set for each of the HMI clients 2, among operation right processing information is stored in the global variable storage section 12. Furthermore, operation right processing information for each screen on an operation right, which is set for each operation monitoring screen of each of the HMI clients 2, among operation right processing information is stored in the first local variable storage section 13a the second local variable storage section 13b.

The operation right processing means of each of the HMI clients 2 performs operation right processing on an operation monitoring screen on the basis of operation right processing information stored in the client-side operation right processing information storage section.

Specifically, when the first operation monitoring screen 9a of the first HMI client 2a is operated, the first operation right processing means 11a of the first HMI client 2a executes operation right processing for determining whether or not the operation in question is authorized, by referring to the operation right processing information for each client stored in the global variable storage section 12 of the first HMI client 2a and the operation right processing information for each screen stored in the first local variable storage section 13a of the first HMI client 2a.

Furthermore, when the second operation monitoring screen 9b of the first HMI client 2a is operated, the second operation right processing means 11b of the first HMI client 2a executes operation right processing for determining whether or not the operation in question is authorized, by referring to the operation right processing information for each client stored in the global variable storage section 12 of the first HMI client 2a and the operation right processing information for each screen stored in the second local variable storage section 13b of the first HMI client 2a.

Also for the second HMI client 2b, similarly, when the first operation monitoring screen 9a of the second HMI client 2b is operated, the first operation right processing means 11a of the second HMI client 2b executes operation right processing for determining whether or not the operation in question is authorized, by referring to the operation right processing information for each client stored in the global variable storage section 12 of the second HMI client 2b and the operation right processing information for each screen stored in the first local variable storage section 13a of the second HMI client 2b.

Furthermore, when the second operation monitoring screen 9b of the second HMI client 2b is operated, the second operation right processing means 11b of the second HMI client 2b executes operation right processing for determining whether or not the operation in question is authorized, by referring to the operation right processing information for each client stored in the global variable storage section 12 of the second HMI client 2b and the operation right processing information for each screen stored in the second local variable storage section 13b of the second HMI client 2b.

Operation right processing information is stored in the database 8a provided in the HMI server 8. Operation right processing information is stored in the database 8a of the HMI server 8 as a tag 14 relating to operation right processing information. Operation right processing information 14a stored in the tag 14 relating to operation right processing information is composed of an initial value, a current value, an operation history, and an update cycle as well as other information.

Operation right processing information which is stored in the global variable storage section 12 as well as the first local variable storage section 13a and the second local variable storage section 13b, which are the client-side operation right processing information storage means of the HMI client 2, is a duplicate of the operation right processing information stored in the database 8a of the HMI server 8.

That is, the operation right processing information stored in the database 8a of the HMI server 8 is sent at prescribed timing to each of the HMI clients 2 via the second communication network 7b. And each of the HMI clients 2 stores the operation right processing information sent from the HMI server 8 in the global variable storage section 12 as well as the first local variable storage section 13a and the second local variable storage section 13b.

Here, the above-described prescribed timing of sending operation right processing information from the HMI server 8 is set, for example, at a time when the operation right processing information 14a of the tag 14 relating to the operation right processing information stored in the database 8a of the HMI server 8 is updated. Usually, the timing of updating the operation right processing information 14a of the tag 14 relating to the operation right processing information stored in the database 8a of the HMI server 8 differs between operation right processing information for each client and operation right processing information for each screen.

As described above, operation right processing information for each client is set for each of the HMI clients 2. For this reason, the timing of updating the operation right processing information for each client stored in the HMI server 8 is, for example, a time when the power supply of the HMI clients 2 is turned on, and a time when the manager and others log in to the HMI clients 2.

As described above, operation right processing information for each screen is set for each operation monitoring screen of each of the HMI clients 2. For this reason, the timing of updating the operation right processing information for each screen stored in the HMI servers 8 is, for example, a time when an operation monitoring screen is newly displayed in the HMI clients 2 and a time when an operation monitoring screen which is displayed is changed.

In this manner, the duplication of operation right processing information from the database 8a of the HMI server 8 to the global variable storage section 12 and local variable storage section of each of the HMI clients 2 is performed, at the above-described predetermined timing, for example, a time when the power supply of the HMI clients 2 is turned on, and a time when an operation monitoring screen is newly displayed in the HMI clients 2.

On the other hand, as described above, the access to the global variable storage section 12 and the local variable storage section by the operation right processing means in each of the HMI clients 2 is performed each time an operation is performed on an operation monitoring screen or the like and operation right processing becomes necessary.

Therefore, the processing for duplicating the operation right processing information stored in the database 8a of the HMI server 8 to the global variable storage section 12 and local variable storage sections of the HMI clients 2 and the access from the operation right processing means of the HMI clients 2 to the global variable storage section 12 and the local variable storage sections are performed in a non-synchronous manner independently from each other.

The plant control monitoring system which is configured as described above includes: a controller which controls a plurality of machine groups constituting a plant; a plurality of HMI clients which are provided in such a manner as to correspond to each of the plurality of machine groups and in which one or more operation monitoring screens are displayed; an HMI server which is provided in such a manner as to be communicable with the HMI clients and collects data from the controller; a server-side storage section which is provided in the HMI server and stores operation right processing information on an operation right for the machine groups on the operation monitoring screens displayed in the HMI clients; client-side storage sections which are provided in the HMI clients and store operation right processing information duplicated from operation right processing information stored in the server-side storage section; and operation right processing sections which are provided in the HMI clients in such a manner as to correspond to each of the operation monitoring screens and perform operation right processing on the operation monitoring screens on the basis of operation right information stored in the client-side storage sections. In this plant control monitoring system, the client-side storage section includes: a global variable storage section which is provided for each of the HMI clients and is accessible from the operation right processing section belonging to the same HMI client; and a local variable storage section which is provided for each of the operation monitoring screens and is accessible from the operation right processing section belonging to the same operation monitoring screen. The global variable storage section stores operation right processing information for each client on an operation right set for each of the HMI clients among operation right information. The local variable storage section stores operation right processing information for each screen on an operation right set for each of the operation monitoring screens among operation right information.

For this reason, it is possible to reduce communication traffic between a client and a server and to achieve an improvement in processing speed. At the same time, by storing an operation right set in each terminal of each client and an operation right set for each operation monitoring screen in the global variable storage section and the local variable storage section, respectively, it is possible to perform elimination of unnecessary access and the like in consideration of the properties of the operation rights.

Furthermore, by performing the duplication (sending) of the operation right processing information stored in the server-side storage section to the client-side storage sections and the access from the operation right processing section to the client-side storage sections in a non-synchronous manner independently from each other, it is possible to perform operation right processing in the clients regardless of communication processing between the clients and the server, enabling processing speed to be further improved.

Embodiment 2

Figure 3:
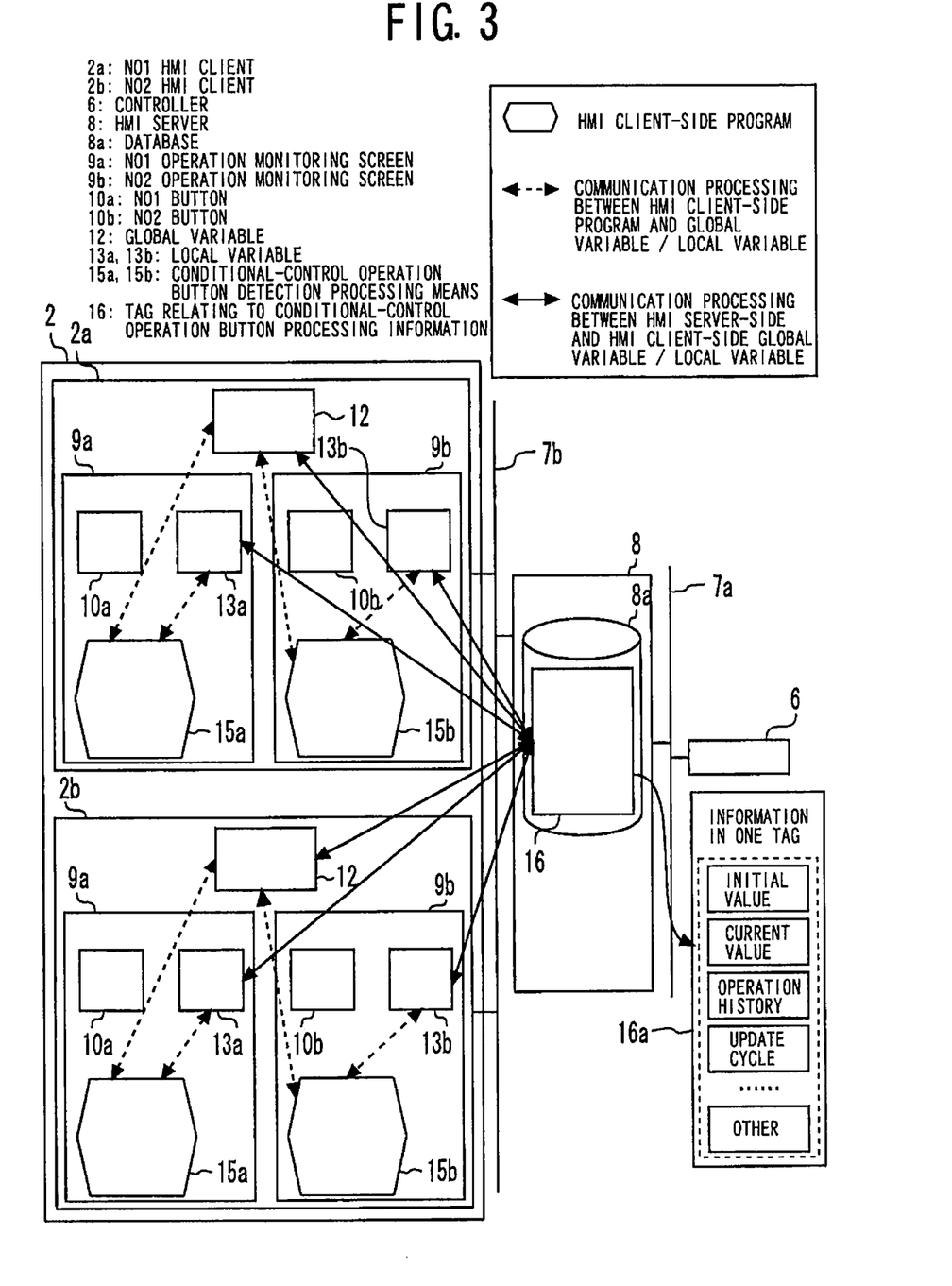
FIG. 3 is a diagram to explain the configuration of the plant control monitoring system related to Embodiment 2 of the present invention.

FIG. 3 relates to Embodiment 2 of the present invention and is a diagram to explain the configuration of the plant control monitoring system.

In Embodiment 2 which will be described here, in addition to the configuration of Embodiment 1 described above, information necessary for processing performed when the conditional-control operation buttons displayed on the operation monitoring screen of the HMI clients are operated, is disposed not only on the HMI server, but also on the HMI clients. And it is ensured that the processing to be performed when the conditional-control operation buttons displayed on the operation monitoring screen of the HMI clients are operated, is carried out by referring to the information stored in the HMI clients.

That is, in FIG. 3, the first operation button 10a displayed on the first operation monitoring screen 9a of each of the HMI clients 2 and the second operation button 10b displayed on the second operation monitoring screen 9b of each of the HMI clients 2 are conditional-control operation buttons.

A conditional-control operation button is a button which is such that the processing to be performed when the conditional-control operation button in question is operated differs from one condition to another. Specifically, for example, a toggle button for switching the function of field machinery 1 between being effective and being ineffective corresponds to this conditional-control operation button.

In this example of a toggle button, in the case where for a specific function of field machinery 1 corresponding to the toggle button in question, the function in question is ineffective when the toggle button in question is operated, it is necessary that an operation signal to the effect that the function in question is effective be sent from the HMI client 2 to the HMI server 8. And conversely, in the case where the function in question is effective when the toggle button in question is operated, it is necessary that an operation signal to the effect that the function in question is ineffective be sent from the HMI client 2 to the HMI server 8.

In this manner, a conditional-control operation button is such that when this button is operated, after a condition determination is performed, the contents of processing associated with the operation in question are determined. In order to carry out conditional-control operation button detection processing, which determines the contents of processing associated with the operation in question, by performing condition determination when a conditional-control operation button is operated, each of the HMI clients 2 is provided with conditional-control operation button detection processing means. The conditional-control operation button detection processing means is, as a rule, provided in such a manner as to correspond to each of conditional-control operation buttons displayed on the monitoring operation screens of the HMI clients 2.

Specifically, in such a manner as to correspond to the first operation button 10a of the first HMI client 2a, first conditional-control operation button detection processing means 15a is provided in the first HMI client 2a. And in such a manner as to correspond to the second operation button 10b of the first HMI client 2a, second conditional-control operation button detection processing means 15b is provided in the first HMI client 2a.

Similarly, in such a manner as to correspond to the first operation button 10a of the second HMI client 2b, first conditional-control operation button detection processing means 15a is provided in the second HMI client 2b. And in such a manner as to correspond to the second operation button 10b of the second HMI client 2b, second conditional-control operation button detection processing means 15b is provided in the second HMI client 2b.

Conditional-control operation button processing information necessary for conditional-control operation button detection processing is stored in the database 8a provided in the HMI server 8. Conditional-control operation button processing information is stored in the database 8a of the HMI server 8 as a tag 16 relating to conditional-control operation button processing information. Conditional-control operation button processing information 16a stored in the tag 16 relating to conditional-control operation button processing information is composed of an initial value, a current value, an operation history, and an update cycle as well as other information. In the above example of a toggle button, conditional-control operation button processing information is information as to whether a specific function of field machinery 1 corresponding to the toggle button in question is effective or ineffective.

Information obtained by duplicating the conditional-control operation button processing information stored in the database 8a of the HMI server 8 is stored in the global variable storage sections 12 as well as the first local variable storage section 13a and second local variable storage section 13b of each of the HMI clients 2. In this sense, the global variable storage sections 12 as well as the first local variable storage section 13a and the second local variable storage section 13b constitute a client-side conditional-control operation button processing information storage section.

And on the basis of the conditional-control operation button processing information stored in the client-side conditional-control operation button processing information storage section, the conditional-control operation button detection processing means of each of the client HMI clients 2 performs conditional-control operation button detection processing to be carried out when the conditional-control operation buttons displayed on the operation monitoring screen is operated.

Specifically, when the first operation button 10a displayed on the first operation monitoring screen 9a of the first HMI client 2a is operated, the first conditional-control operation button detection processing means 15a of the first HMI client 2a executes conditional-control operation button detection processing for the operation in question by referring to the conditional-control operation button processing information stored in the global variable storage sections 12 and first local variable storage section 13a of the first HMI client 2a.

Also, when the second operation button 10b displayed on the second operation monitoring screen 9b of the first HMI client 2a is operated, the second conditional-control operation button detection processing means 15b of the first HMI client 2a executes conditional-control operation button detection processing for the operation in question by referring to the conditional-control operation button processing information stored in the global variable storage sections 12 and second local variable storage section 13b of the first HMI client 2a.

Similarly, when the first operation button 10a displayed on the first operation monitoring screen 9a of the second HMI client 2a is operated, the first conditional-control operation button detection processing means 15a of the second HMI client 2b executes conditional-control operation button detection processing for the operation in question by referring to the conditional-control operation button processing information stored in the global variable storage section 12 and first local variable storage section 13a of the second HMI client 2b.

Also, when the second operation button 10b displayed on the second operation monitoring screen 9b of the second HMI client 2b is operated, the second conditional-control operation button detection processing means 15b of the second HMI client 2b executes conditional-control operation button detection processing for the operation in question by referring to the conditional-control operation button processing information stored in the global variable storage section 12 and second local variable storage section 13b of the second HMI client 2b.

The conditional-control operation button processing information stored in the database 8a of the HMI server 8 is sent at prescribed timing to each of the HMI clients 2 via the second communication network 7b. And each of the HMI clients 2 stores the conditional-control operation button processing information sent from the HMI server 8 to the global variable storage section 12 as well as the first local variable storage section 13a and the second local variable storage section 13b.

Here, the above-described predetermined timing of sending conditional-control operation button processing information from the HMI server 8 and duplicating the information to the HMI client 2 side is set, for example, at a time when the conditional-control operation button processing information 16a of the tag 16 relating to conditional-control operation button processing information stored in the database 8a of the HMI server 8 is updated.

On the other hand, as described above, access to the global variable storage section 12 and the local variable storage sections by the conditional-control operation button detection processing means in each of the HMI clients 2 is performed each time an operation is performed on the conditional-control operation buttons of the operation monitoring screens and conditional-control operation button detection processing becomes necessary.

Therefore, the processing for duplicating the conditional-control operation button processing information stored in the database 8a of the HMI server 8 to the global variable storage section 12 and local variable storage sections of the HMI clients 2 and the access from the conditional-control operation button detection processing means of the HMI clients 2 to the global variable storage section 12 and the local variable storage sections are performed in a non-synchronous manner independently from each other.

Other configurations are the same as in Embodiment 1 and detailed descriptions thereof are omitted.

The plant control monitoring system configured as described above is such that, in the configuration of Embodiment 1, the server-side storage section stores conditional-control operation part processing information on conditional-control operation parts on the operation monitoring screen displayed in the HMI clients. In this plant control monitoring system, the client-side storage sections store conditional-control operation part information duplicated from the conditional-control operation part processing information stored in the server-side storage section, and the HMI clients include a conditional-control operation part detection processing section which performs conditional-control operation part processing to be carried out when the conditional-control operation part displayed on the operation monitoring screen is operated on the basis of conditional-control operation part processing information stored in the client-side storage sections.

For this reason, in addition to the fact that the same effects as in Embodiment 1 can be produced, it is possible to reduce communication traffic between a client relating to conditional-control operation part processing and a server and to achieve an improvement in processing speed.

Embodiment 3

Figure 4:
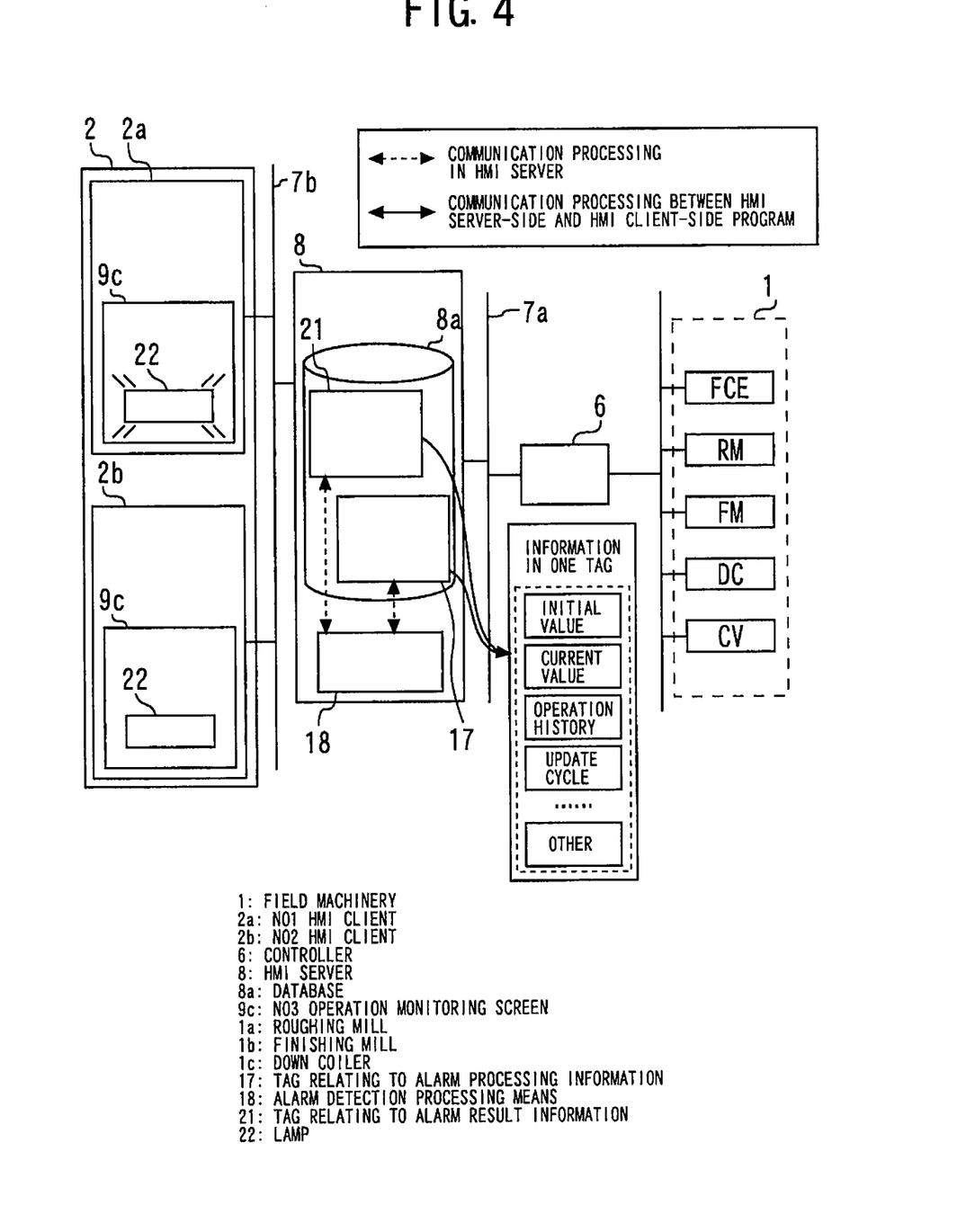
FIG. 4 is a diagram to explain the configuration of the plant control monitoring system related to Embodiment 3 of the present invention.
Figure 5:
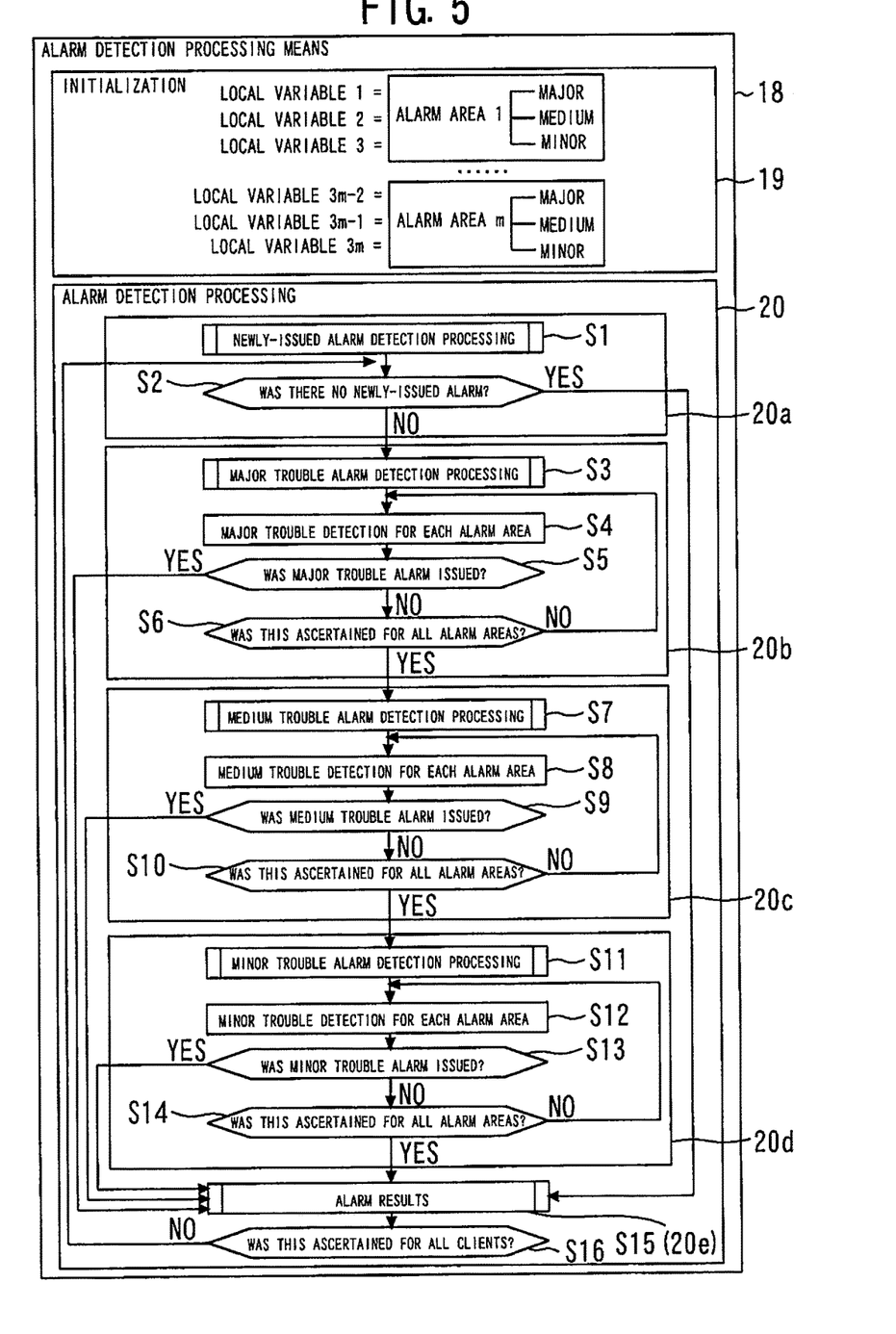
FIG. 5 is a flowchart showing actions of the plant control monitoring system related to Embodiment 3 of the present invention.

FIGS. 4 and 5 relate to Embodiment 3 of the present invention. FIG. 4 is a diagram to explain the configuration of the plant control monitoring system, and FIG. 5 is a flowchart showing actions of the plant control monitoring system.

In the plant control monitoring system, in the case where a situation which impedes an ordinary plant operation, such as a trouble in machine devices constituting plant equipment, it is ensured that an alarm is issued to the manager and the others of the plant. In the case where this alarm is issued, it is ensured that "a representative alarm" for alerting the manager and others to that it is necessary to verify detailed information on the situation which occurred, is first issued.

Usually, this representative alarm is issued for each alarm area, which is set for each of machine groups constituting the plant equipment, which is an object of alarm monitoring. Therefore, alarm detection processing for detecting the occurrence of a situation which requires an alarm has hitherto been performed individually in the HMI clients corresponding to each machine group, i.e., alarm area.

In contrast to this, in Embodiment 3 which will be described here, in the configuration of the client-server type adopted in Embodiment 1 and Embodiment 2 described above, it is ensured that alarm detection processing for all alarm areas (machine groups) is collectively carried out on the HMI server side.

As described in Embodiment 1, the HMI server 8 acquires information on the condition of the field machinery 1 from the controller 6 via the first communication network 7a. As shown in FIG. 4, information used in the detection of alarms among the information on the condition of the field machinery 1 thus acquired, is stored in the database 8a of the HMI server 8 as a tag 17 relating to alarm processing information.

Specific examples of information to be stored in this tag 17 relating to alarm processing information include the severity of a trouble which occurred in the field machinery 1 and the machine group, i.e., alarm area in which the trouble in question occurred. The severity of a trouble relates to the priority of an alarm and, for example, there are three stages in decreasing order of severity, a major trouble, a medium trouble, and a minor trouble.

The HMI server 8 is provided with alarm detection processing means 18. This alarm detection processing means 18 performs alarm detection processing for detecting the occurrence of a situation which requires an alarm, by referring to the contents stored in the tag 17 relating to the alarm processing information of the database 8a. FIG. 5 shows the flow of alarm detection processing performed by this alarm detection processing means 18 of the HMI server 18. This alarm detection processing is executed by the alarm detection processing means 18 in a predetermined cycle.

First, before alarm detection processing, initialization processing 19 of local variables used in alarm detection processing is performed. Three local variables are used for one alarm area. This is because local variables which store information as to whether or not an alarm has been detected for each of a major trouble, a medium trouble, and a minor trouble are necessary for each alarm area.

Therefore, in the case where there are m alarm areas which are objects of monitoring (m is a natural number), the number of necessary local variables is 3 m in all. And a major trouble flag of alarm area 1 is stored in the local variable 1, a medium trouble flag of alarm area 1 is stored in the local variable 2, and a minor trouble flag of alarm area 1 is stored in the local variable 3. And a major trouble flag of alarm area m is stored in the local variable (3m-2), a medium trouble flag of alarm area m is stored in the local variable (3m-1), and a minor trouble flag of alarm area m is stored in the local variable (3m).

After this initialization processing 19 is performed, the flow proceeds to actual alarm detection processing 20. Alarm detection processing 20 involves newly issued alarm detection processing 20a, major trouble alarm detection processing 20b, medium trouble alarm detection processing 20c, minor trouble alarm detection processing 20d, and alarm result processing 20e.

First, when newly issued alarm detection processing 20a is started (Step S1), in Step S2 the alarm detection processing means 18 ascertains whether or not there is no newly issued alarm. And in the case where there is no newly issued alarm, the flow proceeds to Step S15, in which the alarm detection processing means 18 performs alarm result processing 20e. In this case, major trouble alarm detection processing 20b, medium trouble alarm detection processing 20c, and minor trouble alarm detection processing 20d are not executed.

On the other hand, in the case where in Step S2 there is a newly issued alarm, the flow proceeds to Step S3, in which major trouble alarm detection processing 20b is started. When this major trouble alarm detection processing 20b is started, in Step S4 the alarm detection processing means 18 carries out major trouble detection for each alarm area. In subsequent Step S5, on the basis of results of the detection in Step S4, whether or not a major trouble alarm has been issued is ascertained. In the case where it is ascertained that a major trouble alarm has been issued, the flow proceeds to Step S15, in which alarm result processing 20e is performed. In this case, medium trouble alarm detection processing 20c and minor trouble alarm detection processing 20d are not executed.

On the other hand, when it is ascertained in Step S5 that no major trouble alarm has been issued, the flow proceeds to Step S6. In Step S6, the alarm detection processing means 18 ascertains whether or not ascertaining the issue of a major trouble alarm has been finished in all alarm areas (1? m). And in the case where ascertaining the issue of a major trouble alarm has not been finished in all alarm areas, the flow returns to Step S4.

In the case where it is ascertained in Step S6 that ascertaining the issue of a major trouble alarm has been finished in all alarm areas, the flow proceeds to Step S7, in which medium trouble alarm detection processing 20c is started. When this medium trouble alarm detection processing 20c is started, in Step S8 the alarm detection processing means 18 carries out medium trouble detection for each alarm area. In subsequent Step S9, on the basis of results of the detection in Step S8, whether or not a medium trouble alarm has been issued is ascertained. In the case where it is ascertained that a medium trouble alarm has been issued, the flow proceeds to Step S15, in which alarm result processing 20e is performed. In this case, minor trouble alarm detection processing 20d is not executed.

On the other hand, when it is ascertained in Step S9 that no medium trouble alarm has been issued, the flow proceeds to Step S10. In Step S10, the alarm detection processing means 18 ascertains whether or not ascertaining the issue of a medium trouble alarm has been finished in all alarm areas (1? m). And in the case where ascertaining the issue of a medium trouble alarm has not been finished in all alarm areas, the flow returns to Step S8.

In the case where it was ascertained in Step S10 that ascertaining the issue of a medium trouble alarm has been finished in all alarm areas, the flow proceeds to Step S11, in which minor trouble alarm detection processing 20d is started. When this minor trouble alarm detection processing 20d is started, in Step S12 the alarm detection processing means 18 carries out minor trouble alarm detection for each alarm area. In subsequent Step S13, on the basis of results of the detection in Step S12, whether or not a minor trouble alarm has been issued is ascertained. In the case where it is ascertained that a minor trouble alarm has been issued, the flow proceeds to Step S15, in which alarm result processing 20e is performed.

On the other hand, when it is ascertained in Step S13 that no minor trouble alarm has been issued, the flow proceeds to Step S14. In Step S14, the alarm detection processing means 18 ascertains whether or not ascertaining the issue of a minor trouble alarm has been finished in all alarm areas (1? m). And in the case where ascertaining the issue of a minor trouble alarm has not been finished in all alarm areas, the flow returns to Step S12. In the case where ascertaining the issue of a minor trouble alarm has been finished in all alarm areas, the flow proceeds to Step S15, in which alarm result processing 20e is performed.

In the alarm result processing 20e of Step S15, the alarm detection processing means 18 writes results of the above processing in a tag 21 relating to alarm result information of the database 8a provided in the HMI server 8.

In the case where there are a plurality of HMI clients 2, the alarm area (machine group) which is an object of monitoring may differ from one HMI client 2 to another. In the case where an alarm area which differs from one HMI client 2 to another is set, after the alarm result processing 20e of Step S15 the flow proceeds to Step S16, in which whether or not ascertaining the issue of an alarm has been performed for all HMI clients 2 is ascertained. And in the case where ascertaining the issue of an alarm has not been completed for all HMI clients 2, the flow returns to Step S2.

In this manner, when the alarm detection processing by the alarm detection processing means 18 in the flow shown in FIG. 5 is completed, results of alarm detection processing are stored in the tag 21 relating to alarm result information.

A third operation monitoring screen 9c for notifying the manager and others of results of alarm detection is displayed in the HMI client 2. A lamp 22 is displayed on this third operation monitoring screen 9c. The HMI clients 2 make periodical access to the tag 21 relating to alarm result information of the database 8a of the HMI server 8. And in the case where the issue of an alarm has been detected, the manager and others are informed of the issue of an alarm by the lighting-up, the change of color and the like of the lamp 22 of the HMI clients 2.

Here, as described above, there are three stages of alarms: a major trouble alarm, a medium trouble alarm, and a minor trouble alarm in the decreasing order of severity. And as is apparent from the flowchart of FIG. 5, this order of severity is also the order of priority of alarms. It is ensured that the lamp 22 displayed on the third operation monitoring screen 9c of the HMI clients 2 is capable of notification by classifying this priority (severity) of alarms.

In order to achieve this object, for example, the lamp 22 can be an aggregate of a plurality of lamps provided for each stage of priority (severity) of alarms. Or it is also possible to ensure that the manner of lighting-up of the lamp 22 can be classified according to the priority (severity) of alarms. Specific examples of the change of the manner of lighting-up of the lamp 22 include the case where this lamp 22 constantly lights up or blinks, the case where the blinking speed is changed during blinking, and the case where the lighting-up color and brightness of color of the lamp 22 are changed.

Among these cases, the case where the lighting-up color of the lamp 22 is changed according to the severity of an alarm will be described by giving a specific example. First, in the case where a medium trouble has been detected in any one piece of field machinery 1, which is an object of monitoring, the lamp 22 lights up with the color of medium trouble alarm. And in the case where during the lighting-up of the lamp 22 with the color of medium trouble alarm, a new alarm of major trouble is issued, the color of the lamp 22 is changed from the color of medium trouble alarm to the color of major trouble alarm, because the major trouble has a higher priority than the medium trouble.

On the other hand, in the case where a new alarm of minor trouble is issued when the lamp 22 lights up with the color of medium trouble alarm, the color of the lamp 22 is kept with the color of medium trouble alarm as it is and is not changed to the color of minor trouble alarm, because the priority of the minor trouble is lower than the priority of the medium trouble. After that, in the case where medium troubles are all resolved by some measure and only minor troubles remain, the color of the lamp 22 is changed from the color of medium trouble alarm to the color of major trouble alarm.

For other configurations, it is possible to configure Embodiment 3 in the same manner as in Embodiment 1 and Embodiment 2.

In a conventional plant control monitoring system in which a client-server type configuration is adopted, as described above, alarm detection processing is performed individually in each of HMI clients. For this reason, each time alarm detection processing is performed, a plurality of HMI clients make access to a tag relating to alarm processing information of an HMI server via a network. Therefore, although this provides the advantage that the load of alarm detection processing is distributed among the HMI clients, communication processing traffic of alarm processing information between the HMI clients and the HMI server increases, resulting in a decrease in overall processing speed due to a bottleneck caused by this communication processing. This problem becomes more conspicuous because the larger the number of HMI clients and the larger the number of machine groups (alarm areas) which are objects of monitoring, the larger the number of tags to which access is made from the HMI clients.

In contrast to this, the plant control monitoring system of Embodiment 3 of the present invention includes: a controller which controls a plurality of machine groups constituting a plant; a plurality of HMI clients which are provided in such a manner as to correspond to each of the plurality of machine groups and in which one or more operation monitoring screens are displayed; an HMI server which is provided in such a manner as to be communicable with the HMI clients and has a server-side storage section which stores data collected from the controller as alarm processing information; and an alarm detection processing section which is provided in the server-side storage section and performs alarm detection processing, which involves detecting a condition for which an alarm is to be issued for the machine groups corresponding to each of the plurality of HMI clients on the basis of alarm processing information stored in the server-side storage section. In this plant control monitoring system, the server-side storage section stores alarm result information on results of alarm detection processing by the alarm detection processing section, and the HMI clients include a notification section which performs notification of alarms on the alarm result information stored in the server-side storage section.

For this reason, it is not alarm processing information but it is alarm result information, which refers to results that have undergone alarm detection processing, that is communicated between the HMI clients and the HMI server. Because alarm result information includes only results that have undergone alarm detection processing, the data size is smaller than alarm processing information before alarm detection processing. Therefore, it is possible to reduce communication traffic between HMI clients and an HMI server and it is possible to improve the processing speed involved in a series of alarm detection actions.

Furthermore, the alarms are divided into a plurality of classes according to severity, and it is ensured that the alarm detection processing section preferentially detects alarms of greater severity. Therefore, at a point of time when an alarm of greater severity is detected, it is possible to skip detection processing for alarms having smaller severity. This enables the throughput relating to alarm detection to be reduced and it is possible to further improve the processing speed involved in a series of alarm detection actions.

INDUSTRIAL APPLICABILITY

The present invention can be applied to a client-server type plant control monitoring system which includes: a controller which controls a plurality of machine groups constituting a plant; a plurality of HMI clients which are provided in such a manner as to correspond to each of the plurality of machine groups and in which one or more operation monitoring screens are displayed; and an HMI server which is provided in such a manner as to be communicable with the HMI clients and collects data from the controller.

DESCRIPTION OF SYMBOLS 1 field machinery
1a roughing mill
1b finishing mill
1c down coiler
2 HMI client
2a first HMI client
2b second HMI client
3a first roughing mill client
3b second roughing mill client
4a first finishing mill client
4b second finishing mill client
5a first down coiler client 5b second down coiler client
6 controller
7a first communication network
7b second communication network
8 HMI server
8a database
9a first operation monitoring screen
9b second operation monitoring screen
9c third operation monitoring screen
10a first operation button
10b second operation button
11a first operation right processing means
11b second operation right processing means
12 global variable storage section
13a first local variable storage section
13b second local variable storage section
14 tag relating to operation right processing information
14a operation right processing information
15a first conditional-control operation button detection processing means
15b second conditional-control operation button detection processing means
16 tag relating to conditional-control operation button processing information
16a conditional-control operation button processing information
17 tag relating to alarm processing information
18 alarm detection processing means
19 initialization processing
20 alarm detection processing
20a newly issued alarm detection processing
20b major trouble alarm detection processing
20c medium trouble alarm detection processing
20d minor trouble alarm detection processing
20e alarm result processing
21 tag relating to alarm result information
22 lamp

The invention claimed is:

1. A plant control monitoring system, comprising:
controller circuitry which controls a plurality of machine groups constituting a plant;
a plurality of human-machine interface (HMI) clients which are provided in such a manner as to correspond to each of the plurality of machine groups and in which one or more operation monitoring screens are displayed;
an HMI server which is provided in such a manner as to be communicable with the HMI clients and collects data from the controller;
server-side storage circuitry which is provided in the HMI server and stores operation right processing information on an operation right for the machine groups on the operation monitoring screens displayed in the HMI clients;
client-side storage circuitry which are provided in the HMI clients and store operation right processing information duplicated from operation right processing information stored in the server-side storage circuitry; and
operation right processing circuitry which are provided in the HMI clients in such a manner as to correspond to each of the operation monitoring screens and perform operation right processing on the operation monitoring screens based on operation right information stored in the client-side storage circuitry, the operation right processing being a process which determines whether or not an operation to the machine groups is authorized,
wherein the client-side storage circuitry includes:
global variable storage circuitry which is provided for each of the HMI clients and is accessible from the operation right processing circuitry belonging to the same HMI client; and
local variable storage circuitry which is provided for each of the operation monitoring screens and is accessible from the operation right processing circuitry belonging to the same operation monitoring screen,
wherein the global variable storage circuitry stores operation right processing information for each client on an operation right set for each of the HMI clients among operation right information, and
wherein the local variable storage circuitry stores operation right processing information for each screen on an operation right set for each of the operation monitoring screens among operation right information.

2. The plant control monitoring system according to claim 1, wherein duplication of operation right information stored in the server-side storage circuitry to the client-side storage circuitry and access from the operation right processing circuitry to the client-side storage circuitry are performed in a non-synchronous manner independently from each other.

3. The plant control monitoring system according to claim 1, wherein the server-side storage circuitry stores conditional-control operation part processing information on conditional-control operation parts on the operation monitoring screen displayed in the HMI clients,
wherein the client-side storage circuitry stores conditional-control operation part information duplicated from conditional-control operation part processing information stored in the server-side storage circuitry, and
wherein the HMI clients comprise a conditional-control operation part detection processing circuitry which, based on conditional-control operation part processing information stored in the client-side storage circuitry, performs conditional-control operation part processing to be carried out when the conditional-control operation part displayed on the operation monitoring screen is operated.

4. The plant control monitoring system according to claim 3, wherein duplication of conditional-control operation part processing information stored in the server-side storage circuitry to the client-side storage circuitry and access from the conditional-control operation part detection processing circuitry to the client-side storage circuitry are performed in a non-synchronous manner independently from each other.

5. A plant control monitoring system, comprising:
controller circuitry which controls a plurality of machine groups constituting a plant;
a plurality of human-machine interface (HMI) clients which are provided in such a manner as to correspond to each of the plurality of machine groups and in which one or more operation monitoring screens are displayed;
an HMI server which is provided in such a manner as to be communicable with the HMI clients and has a-server-side storage circuitry which stores data collected from the controller as alarm processing information;
operation right processing circuitry which are provided in the HMI clients in such a manner as to correspond to each of the operation monitoring screens and perform operation right processing on the operation monitoring screens based on operation right information stored in client-side storage circuitry provided in the HMI clients, the operation right processing being a process which determines whether or not an operation to the machine groups is authorized; and alarm detection processing circuitry which is provided in the HMI server and performs, based on alarm processing information stored in the server-side storage circuitry, alarm detection processing, the alarm detection processing involving detecting a condition for which an alarm is to be issued for the machine groups corresponding to each of the plurality of HMI clients, wherein the server-side storage circuitry stores alarm result information on results of alarm detection processing by the alarm detection processing circuitry, and wherein the HMI clients comprise a notification circuitry which performs notification of alarms based on the alarm result information stored in the server-side storage circuitry.

6. The plant control monitoring system according to claim 5, wherein the alarms are divided into a plurality of classes according to severity, and wherein the alarm detection processing circuitry preferentially detects alarms of greater severity.

7. The plant control monitoring system according to claim 2, wherein the server-side storage circuitry stores conditional-control operation part processing information on conditional-control operation parts on the operation monitoring screen displayed in the HMI clients, wherein the client-side storage circuitry stores conditional-control operation part information duplicated from conditional-control operation part processing information stored in the server-side storage circuitry, and wherein the HMI clients comprise a conditional-control operation part detection processing circuitry which, based on conditional-control operation part processing information stored in the client-side storage circuitry, performs conditional-control operation part processing to be carried out when the conditional-control operation part displayed on the operation monitoring screen is operated.

8. The plant control monitoring system according to claim 7, wherein duplication of conditional-control operation part processing information stored in the server-side storage circuitry to the client-side storage circuitry and access from the conditional-control operation part detection processing circuitry to the client-side storage circuitry are performed in a non-synchronous manner independently from each other.

* * * * *